United States Patent [19]

Bullivant

[11] Patent Number: 5,277,535
[45] Date of Patent: Jan. 11, 1994

[54] ROLLER CLUTCH DRIVEN FEEDER SYSTEM

[75] Inventor: Kenneth W. Bullivant, Chadds Ford, Pa.

[73] Assignee: K-Tron Technologies, Inc., Wilmington, Del.

[21] Appl. No.: 967,831

[22] Filed: Oct. 28, 1992

[51] Int. Cl.⁵ .................................................. B65G 33/34
[52] U.S. Cl. ..................... 414/326; 198/675; 222/413; 475/294
[58] Field of Search ............... 414/325, 326, 304, 310, 414/311, 312, 319, 320, 321, 526; 198/674, 675, 676, 677, 657, 568, 659, 660, 661, 662, 663, 664, 665, 666, 667, 668, 669, 670, 671, 672, 673; 475/12, 210, 269, 294, 207; 222/412, 413, 489

[56] References Cited

U.S. PATENT DOCUMENTS

| | | | |
|---|---|---|---|
| 806,643 | 12/1905 | Chatfield | 198/675 |
| 1,906,247 | 5/1933 | Buff | 198/675 |
| 2,252,042 | 8/1941 | Sinclair | 475/294 X |
| 3,067,914 | 12/1962 | Ellaby | 414/311 X |
| 3,269,527 | 8/1966 | Denham | 198/674 |
| 3,888,393 | 6/1975 | Drori | 222/413 X |
| 4,502,820 | 3/1985 | Fujii et al. | 222/413 X |
| 4,583,427 | 4/1986 | Blattmann | 475/294 X |

FOREIGN PATENT DOCUMENTS

| | | | |
|---|---|---|---|
| 1059084 | 7/1979 | Canada | 414/326 |
| 3631446 | 3/1987 | Fed. Rep. of Germany | 198/675 |
| 100007 | 6/1983 | Japan | 414/326 |
| 697348 | 11/1979 | U.S.S.R. | 198/674 |
| 1395573 | 5/1988 | U.S.S.R. | 414/326 |

OTHER PUBLICATIONS

"Drawn Cup Roller Clutches" publication; Torrington Service Catalog; Form #100-788-100M, Jul. 1988; pp. 431-435.

*Primary Examiner*—Frank E. Werner
*Attorney, Agent, or Firm*—Ratner & Prestia

[57] ABSTRACT

A volumetric feeder having a reversible motor, in which the feed screw is driven at a first speed when the motor rotates clockwise, and is driven at a second speed when the motor rotates counterclockwise. The feeder includes a first one-way clutch, having a driven inner race and an outer race which rotates freely counterclockwise relative to the inner race when the inner race is driven clockwise. The outer race of the first one-way clutch rotates with the inner race when the inner race is driven counterclockwise. A second one-way clutch has a driven outer race and an inner race which rotates freely clockwise relative to the outer race of the second one-way clutch when the outer race of the second one-way clutch is driven counterclockwise. The inner race of the second one-way clutch rotates with the outer race of the second one-way clutch when the outer race of the second one-way clutch is driven clockwise. The motor shaft is attached to the inner race of the first one-way clutch. A driven shaft is attached to the inner race of the second one-way clutch and is coupled to the feed screw. The outer race of the first clutch is coupled to the driven shaft to rotate the driven shaft at a first speed. The motor shaft is coupled to the outer race of the second clutch to rotate the second clutch and the driven shaft at a second speed which differs from the first speed.

8 Claims, 6 Drawing Sheets

ROLLER CLUTCH DRIVEN FEEDER SYSTEM

BACKGROUND OF THE INVENTION

1. Field of the Invention

The present invention relates to feeding systems and in particular to a drive system for a volumetric feeder.

2. The Related Art

Automated feeding systems for bulk solids are used for process control in a variety of industrial applications. Automated feed systems generally include a feed hopper for containing the material and a feeder for metering out a desired amount of the material per unit of time. Feeder systems generally are divided into two types: volumetric and loss-in-weight feeders.

In volumetric feeders, the volumetric flow rate is controlled. These feeders are advantageous because of their simple construction. An example is the volumetric screw feeder, in which the flow rate is varied as a function of the speed of at least one motorized horizontal screw. Under its own weight, material in the feed hopper is forced into the threads of the feed screw. As the screw turns, it pushes the material through a restrictive tube, to the downstream equipment. Many screw feeders have more than one feed screw to handle sticky materials.

Loss-in-weight (or gravimetric) feeders may be more appropriate where material density is not uniform, the consistency varies, or great accuracy is required. A loss-in-weight feeder may be formed by adding a scale and an appropriate process controller to a volumetric feeder. The control equipment compares the actual amount of material discharged with a preselected setpoint and adjusts the volumetric flow as appropriate. The control equipment typically makes loss-in-weight feeders more costly than volumetric feeders.

In order to most accurately control the material flow rate in a volumetric screw feeder, it is desirable to closely control the speed of the feed screw. One method of controlling the speed of the screw is to vary the motor speed. Relatively inexpensive motor controllers can accurately reduce the motor speed from its maximum value by a factor of 20:1 (referred to as the turn-down ratio). While more accurate controllers can accurately reduce the motor speed to 1/100 of its maximum value, these controllers are more expensive. Furthermore, it may be desirable to accurately reduce the screw speed to less than 1/100 of the maximum motor speed.

More accurate speed control has typically been accomplished by the use of a gear box to vary the number of screw rotations per rotation of the motor shaft. Although the gears are accurate and reliable, they also have disadvantages. To prevent the gears from wearing when operated at high speeds, the gear box is sealed and filled with oil. In order to change the gear ratios, the gear box is mechanically removed and a different gear box is substituted. This gear-changing operation is labor intensive and makes the system more vulnerable to human error.

SUMMARY OF THE INVENTION

The present invention is embodied in a feeder which comprises a hopper for containing solid material and a feed screw beneath the hopper for conducting the solid material from the hopper.

The feeder includes a first one-way clutch, having a driven inner race and an outer race which rotates freely counterclockwise relative to the inner race when the inner race is driven clockwise. The outer race of the first one-way clutch rotates with the inner race when the inner race is driven counterclockwise.

A second one-way clutch has a driven outer race and an inner race which rotates freely clockwise relative to the outer race of the second one-way clutch when the outer race of the second one-way clutch is driven counterclockwise. The inner race of the second one-way clutch rotates with the outer race of the second one-way clutch when the outer race of the second one-way clutch is driven clockwise.

The feeder is driven by a reversible motor having a rotating shaft attached to the inner race of the first one-way clutch. A driven shaft is attached to the inner race of the second one-way clutch and coupled to the feed screw.

The feeder includes first coupling means for coupling the outer race of the first clutch to the driven shaft to rotate the driven shaft at a first speed. The feeder also includes second coupling means for coupling the motor shaft to the outer race of the second clutch to rotate the second clutch and the driven shaft at a second speed which differs from the first speed.

DETAILED DESCRIPTION

Figure 1:
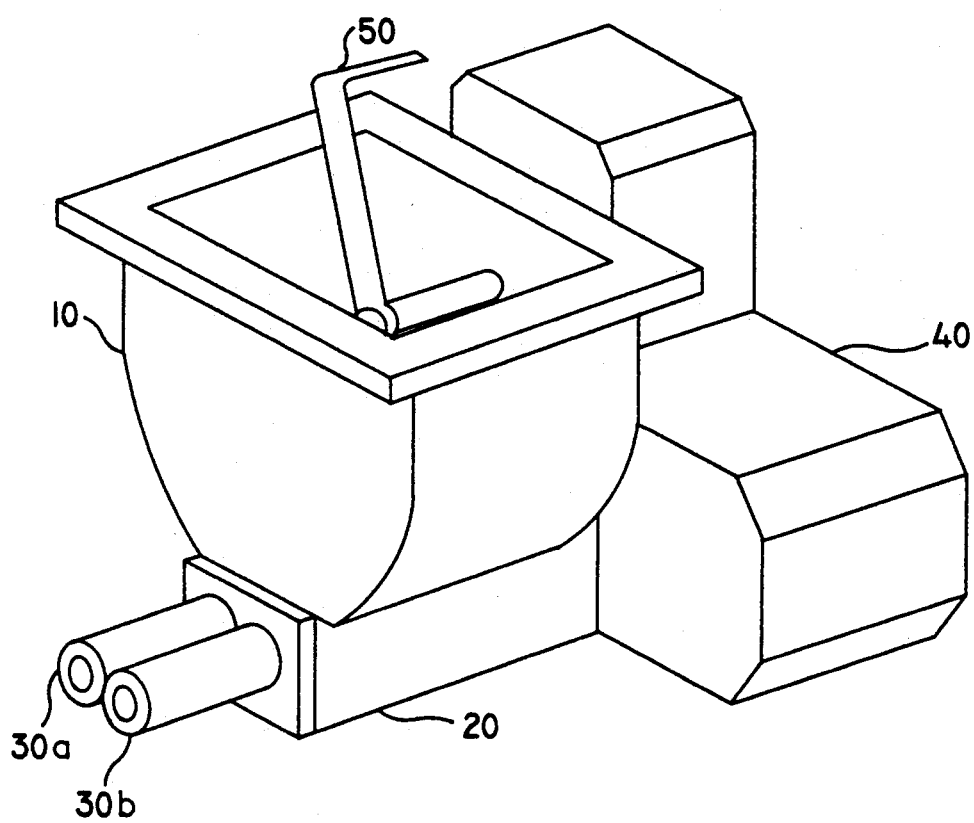
FIG. 1 shows a volumetric feeder in accordance with the invention.

FIG. 1 is a perspective view of an exemplary feeder constructed in accordance with the invention. This volumetric feeder includes a hopper 10 for containing solid material. A feed screw module 20 beneath the hopper 10 includes at least one feed screw 30a to conduct the solid material from the hopper 10. Depending on the material being handled, it may be desirable to include a second feed screw 30b. The material flow rate is proportional to the speed of rotation of the feed screws 30a and 30b.

Figure 2:
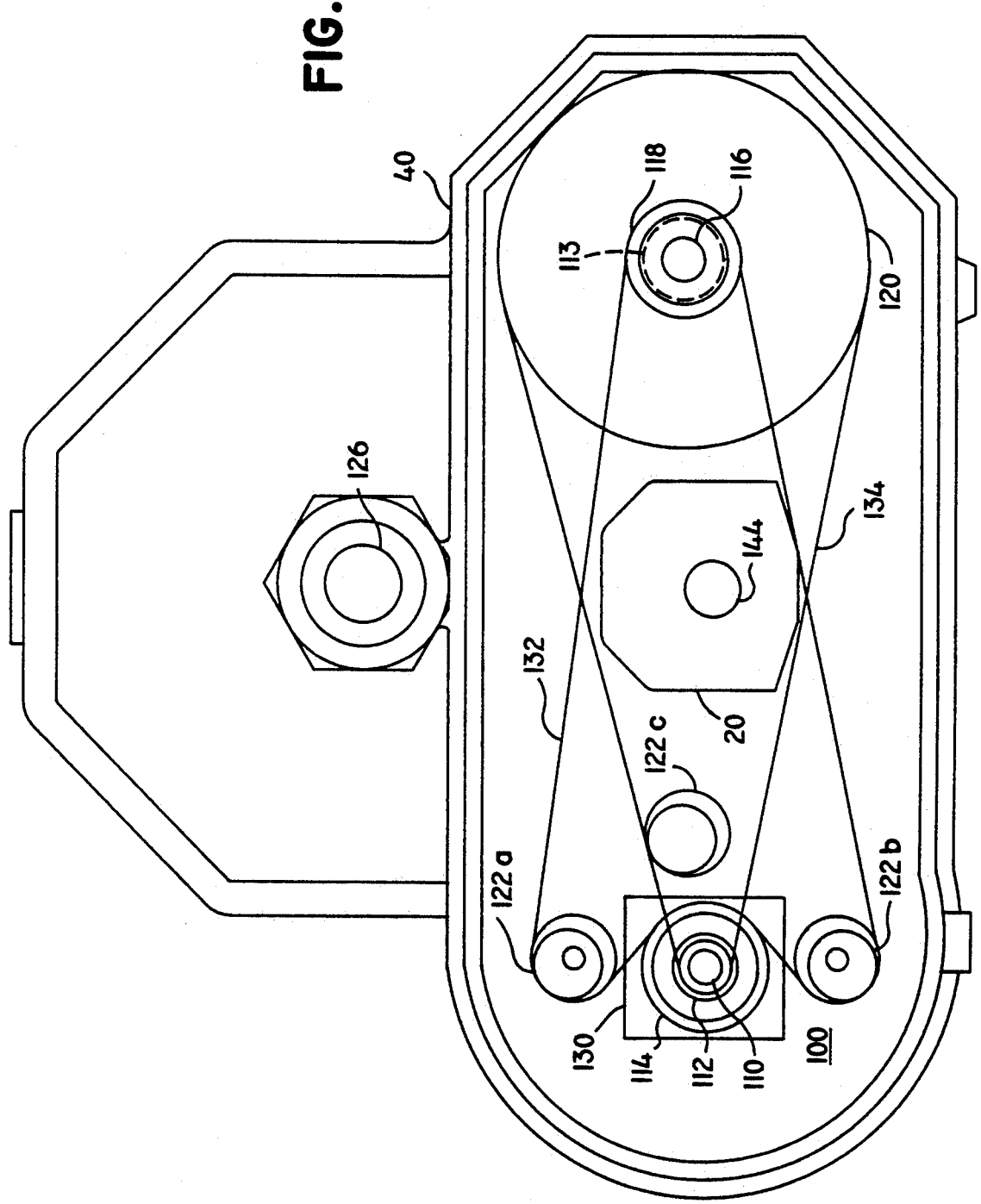
FIG. 2 shows the drive system of the feeder shown in FIG. 1.

A motor, not shown in FIG. 1, and a drive system, also not shown in FIG. 1, are enclosed in a cabinet 40, and are shown in detail in FIG. 2. The drive system is configured so that the feed screws 30a and 30b rotate at one speed when the motor shaft rotates clockwise, and at another speed when the motor rotates counterclockwise, as is described in detail below.

Referring again to FIG. 1, the material drops under its own weight through an opening (not shown) at the bottom of the hopper 10, and into the feed screw module 20. For some materials and hopper opening geometries, the material tends to form a bridge in the opening of the hopper 10. This bridge is capable of supporting the weight of the material above it. To prevent bridges from choking off the material flow, an agitator 50 may be added to stir the material near the hopper opening, eliminating any bridge that forms. This prevents the bridged material from blocking the opening. Agitator 50 also scrapes material which tends to adhere to the walls of hopper 10.

FIG. 2 shows the drive system of the volumetric feeder. The feed screw module 20 is driven by a reversible motor 130 which has a rotating shaft 110. The motor may be operated in either direction at a speed which varies, for example, from 60 to 1800 revolutions per minute (RPM). Reversing the direction of the motor rotation, without changing the motor speed, causes a change in feed screw 30a rotation speed, without changing the screw rotation direction, as is explained in detail below.

Figure 3:
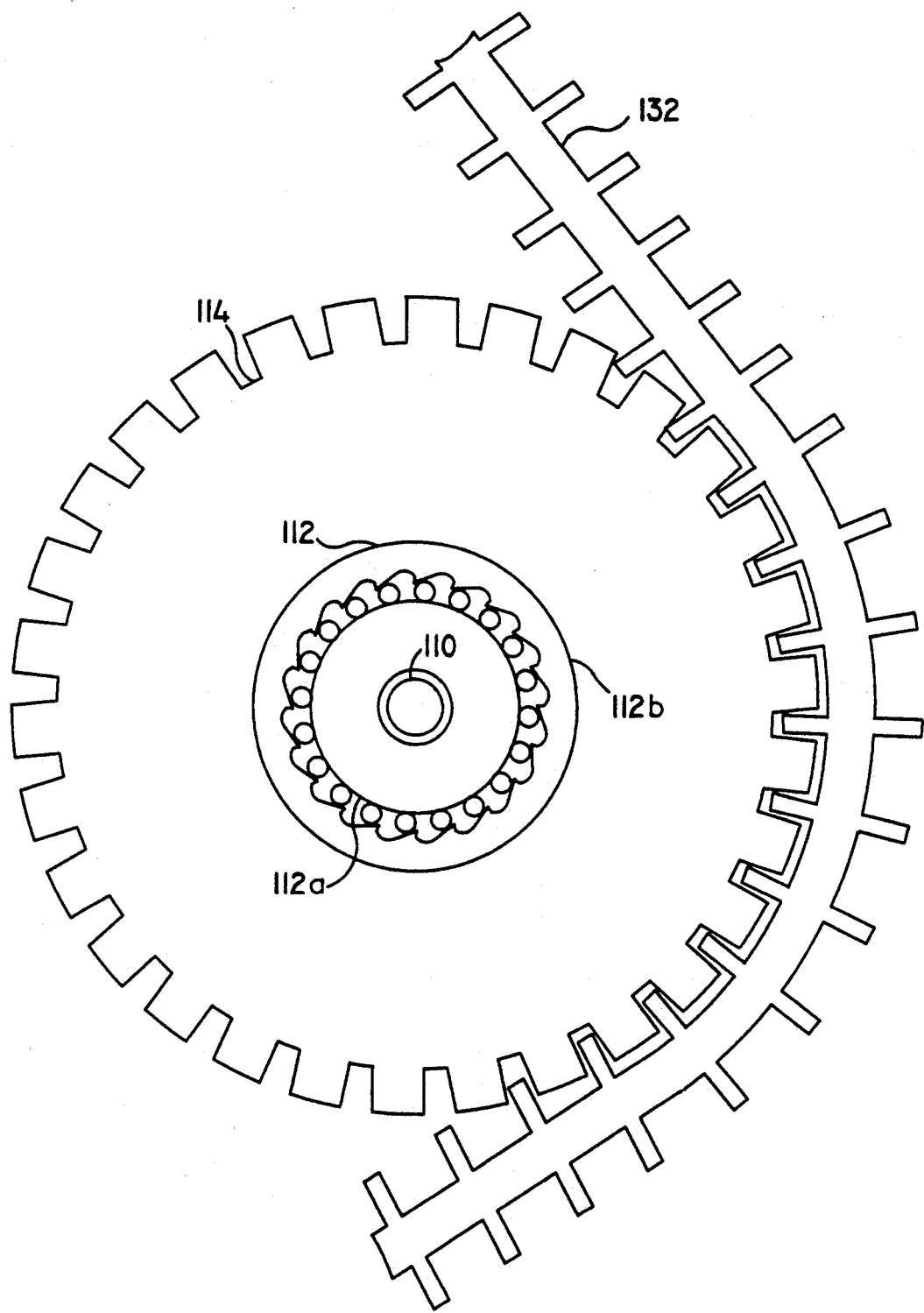
FIG. 3 shows a detail of the drive system shown in FIG. 2.

A first one-way clutch 112 (also known as a roller clutch or freewheeling clutch) has a driven inner race 112a, attached to the motor shaft 110 as shown in detail in FIG. 3. The first one-way clutch 112 has an outer race 112b which rotates freely counterclockwise relative to inner race 112a when inner race 112a is driven clockwise by rotation of motor shaft 110. When inner race 112a is driven counterclockwise by rotation of motor shaft 110, one-way clutch 112 grips instantaneously, so that outer race 112b rotates with inner race 112a. A first timing belt pulley 114 (also referred to as pulley 114), is attached to the outer race 112b of one-way clutch 112. One-way clutch 112 may be a conventional clutch, such as the Roller Clutch model FC20, manufactured by the Torrington Company of Torrington, Conn.

A driven shaft 116 is positioned parallel to motor shaft 110, at approximately the same height as motor shaft 110. A second timing belt pulley 118 (also referred to as pulley 118) is attached to driven shaft 116, so that driven shaft 116 and pulley 118 rotate together when either shaft 116 or pulley 118 is driven by an externally applied moment.

FIG. 3 is a detailed front view of one-way clutch 112, pulley 114, and a first timing belt 132, which are shown in FIG. 2. Timing belt 132 extends between the first timing belt pulley 114 and the second timing belt pulley 118. First pulley 114, second pulley 118 and timing belt 132 form the first coupling means for rotating driven shaft 116 at a first speed. Timing belt 132 has teeth on both its inside and outside surfaces. Pulley 114 engages the teeth on the outside surface of timing belt 132. Two belt tighteners 122a and 122b, in the form of idler pulleys with teeth, maintain contact between the outside teeth of belt 132 and pulley 114 for positive drive. Because the outside surface of timing belt 132 engages pulley 114, as opposed to the inner surface, timing belt 132 causes the pulley 118 to rotate clockwise when pulley 114 rotates counterclockwise.

In the exemplary embodiment, timing belt 132 is a steel reinforced urethane timing belt. Unlike the gear systems used in prior art feeders, the timing belt 132 does not cause the timing belt pulleys 114 and 118 to wear when operated without lubrication. Furthermore, a drive system in accordance with the exemplary embodiment of the invention may include aluminum timing belt pulleys formed by extrusion. Extruded pulleys are less expensive to produce than the machined gears that are used in prior art feeder drive systems. Generally however, extrusion is not cost effective for larger pulleys such as pulley It is understood by one skilled in the art that the ratio between the rotational speed of pulleys 114 and 118 is determined by the respective number of teeth on each pulley. In the exemplary embodiment, pulleys 114 and 118 each have 30 teeth, so that the first speed of the driven shaft 116 is 1800 RPM, i.e., the same rotational speed as that of motor shaft 110 when motor shaft 110 is driven counterclockwise (causing pulley 114 to rotate counterclockwise).

Referring again to FIG. 2, a second one-way clutch 113 (shown in phantom) has a driven outer race 113b (not shown) and an inner race 113a (not shown). Clutch 113 is similar to clutch 112 and is not shown in detail in the drawings. Inner race 113b rotates freely clockwise relative to outer race 113b of second one-way clutch 113 when the outer race 113b of clutch 113 is driven counterclockwise. The second one-way clutch 113 grips instantaneously so that inner race 113a rotates with the outer race 113b of clutch 113 when the outer race 113b of the clutch 113 is driven clockwise.

Figure 6:
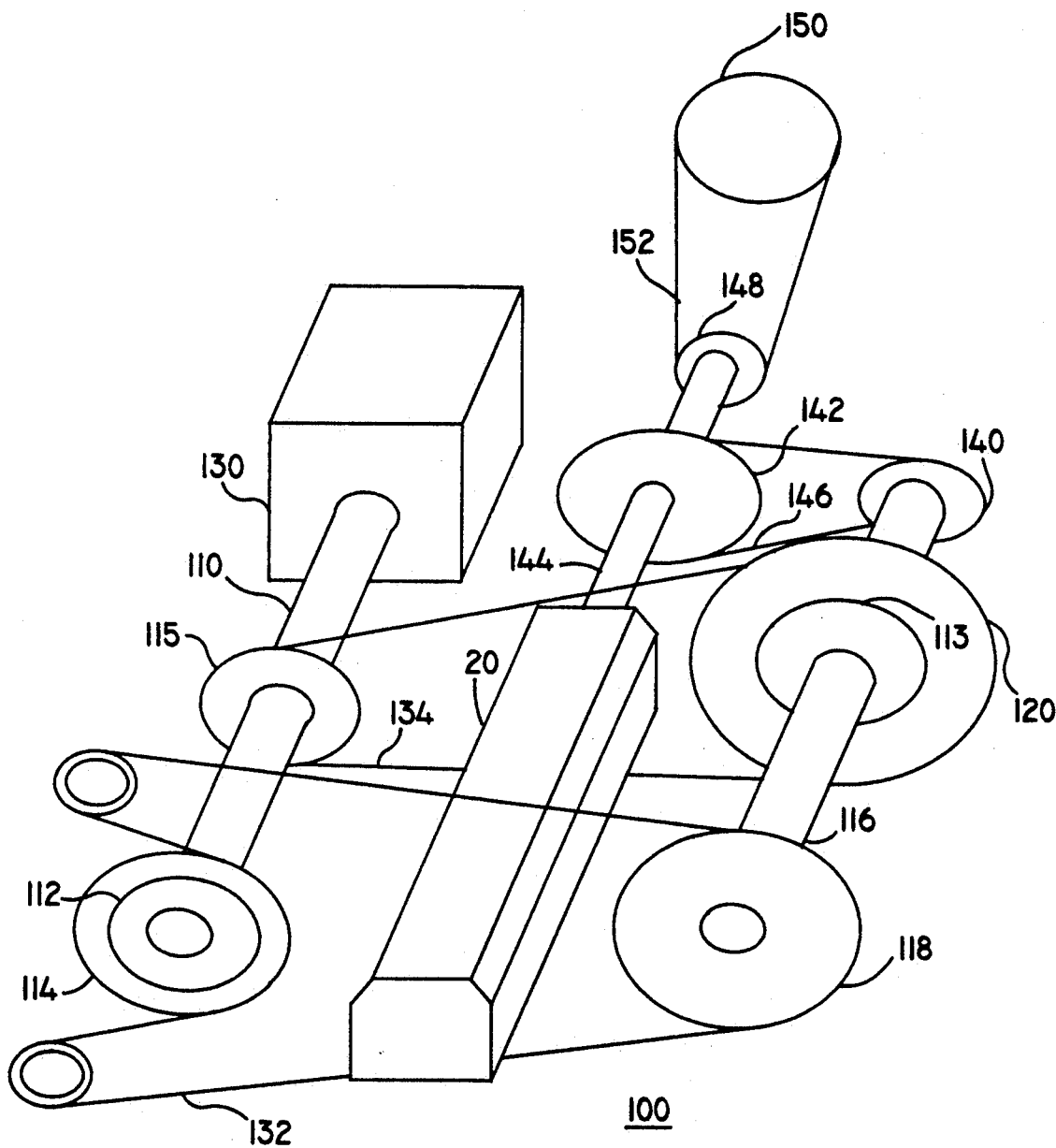
FIG. 6 is a perspective view of the drive system of FIG. 2.

FIG. 6 is a perspective view of the drive system components and the feed screw module 20. As shown in FIG. 6, a third timing belt pulley 115 is attached to motor shaft 110, so that motor shaft 110 and pulley 115 rotate together when either shaft 110 or pulley 115 is driven by an externally applied moment. A fourth timing belt pulley 120 is attached to the outer race 113b of the second one-way clutch 113. A second timing belt 134 extends between the third pulley 115 and fourth pulley 120, which causes the fourth timing belt pulley 120 to rotate when the third timing belt pulley 113 rotates. Unlike timing belt 132, timing belt 134 surrounds pulley 115, so that the inner teeth of timing belt 134 engage the pulley 115. Thus, pulley 120 rotates in the same direction as pulley 115.

Pulleys 115 and 120 and timing belt 134 form the second coupling means for coupling the motor shaft 110 to the outer race 113b of the second clutch 113 to rotate the second clutch 113 and the driven shaft 116 at a second speed (which differs from the first speed) when motor shaft 110 rotates clockwise. The second speed at which driven shaft 116 rotates depends on the ratio between the number of teeth in pulleys 115 and 120. In the exemplary embodiment, pulley 115 has 15 teeth and pulley 120 has 90 teeth, so that the driven shaft 116 rotates at one sixth of the speed at which motor shaft 110 rotates when motor shaft 110 rotates clockwise. For a motor shaft speed of 1800 RPM, driven shaft 116 rotates at 300 RPM in the clockwise direction.

Figure 4:
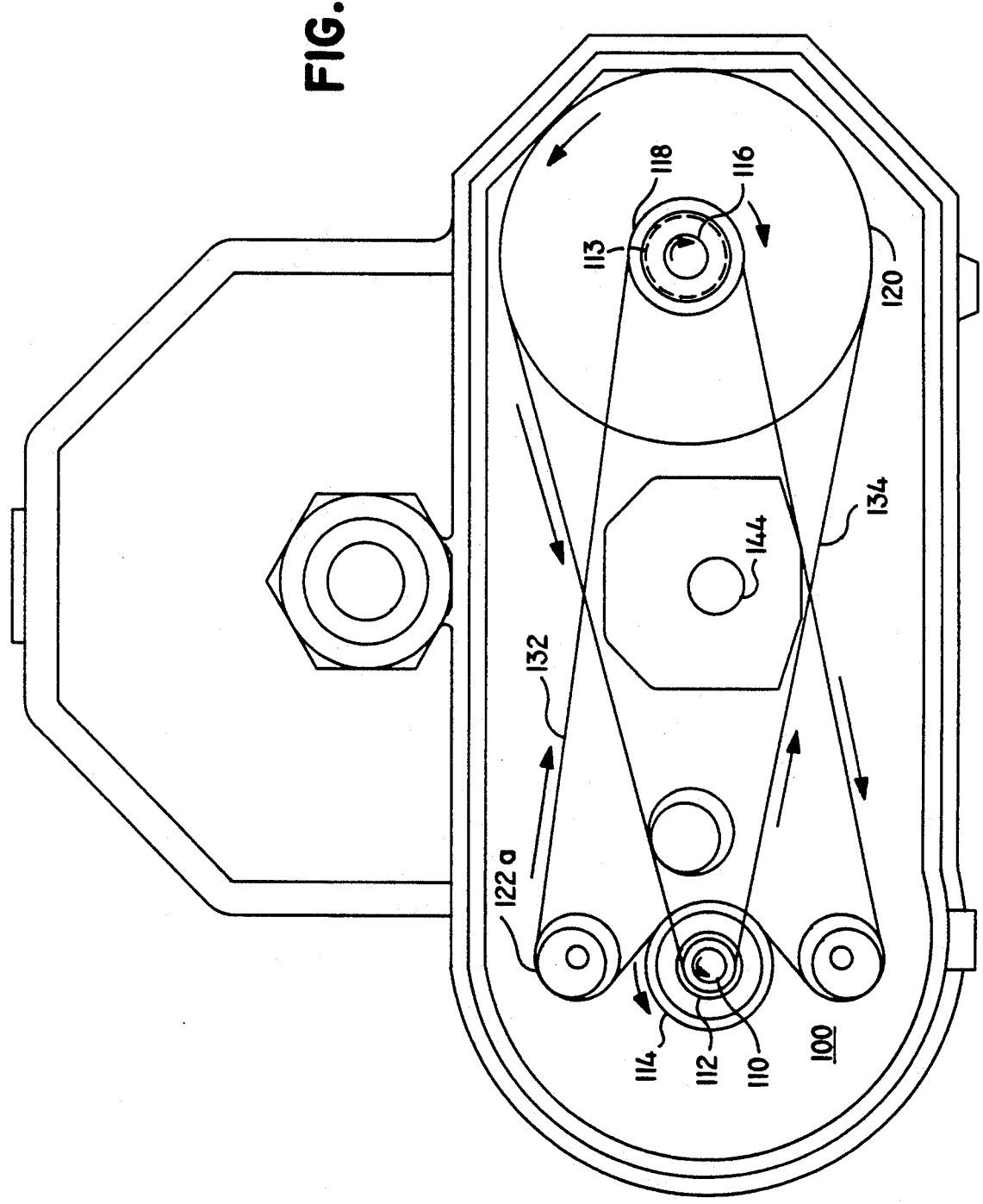
FIG. 4 shows the drive system of FIG. 2 while the motor is rotating counterclockwise.
Figure 5:
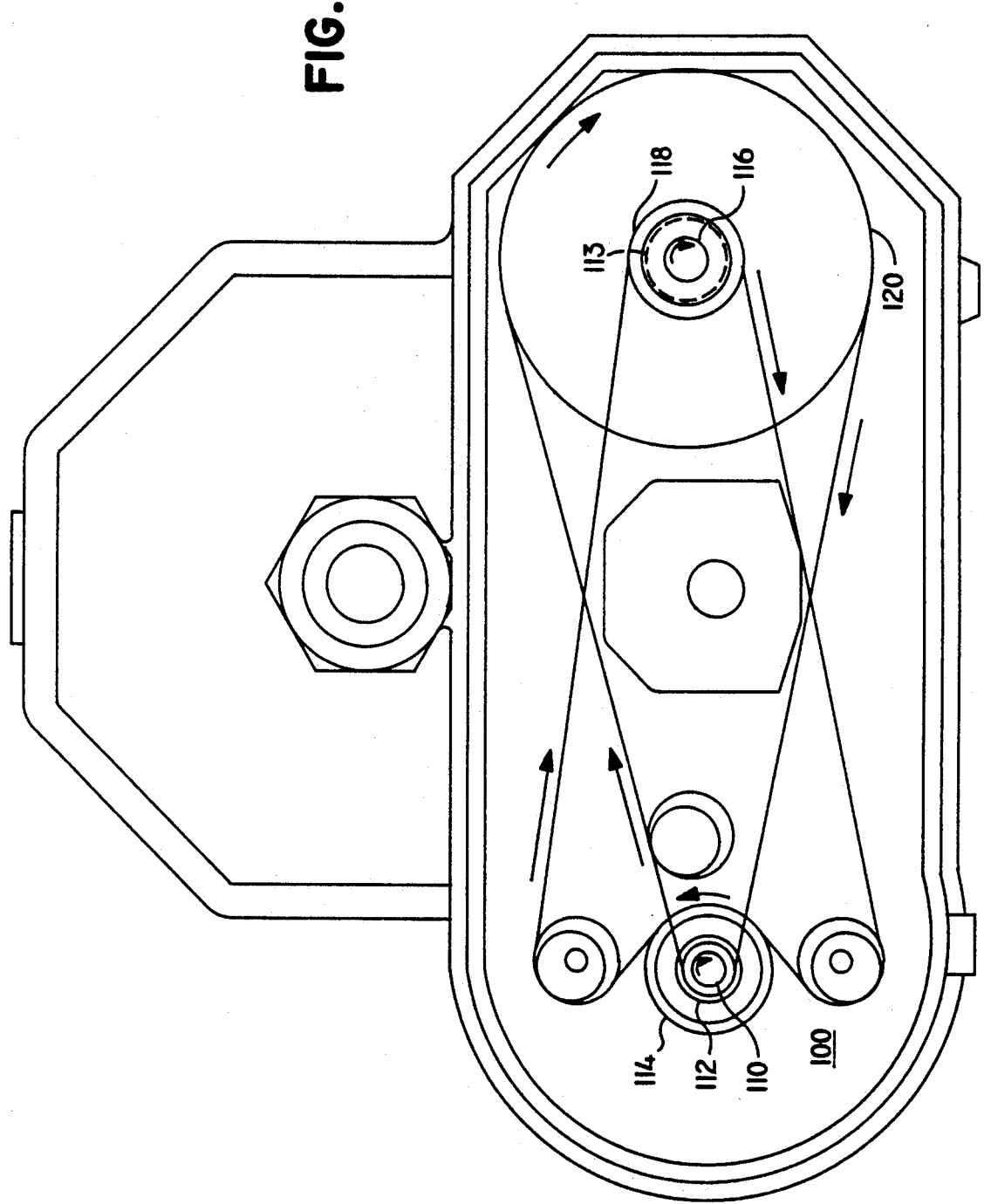
FIG. 5 shows the drive system of FIG. 2 while the motor is rotating clockwise.

FIGS. 4 and 5 show the direction of rotation of each shaft, pulley and timing belt when motor shaft 110 rotates in the counterclockwise and clockwise directions, respectively. Referring first to FIG. 4, when the motor shaft 110 rotates counterclockwise at 1800 RPM, the first one-way clutch 112 is locked, so that pulley 114 also rotates counterclockwise at 1800 RPM. Timing belt 132 rotates clockwise. Timing belt 132 drives pulley 118 and driven shaft 116 clockwise at 1800 RPM. Pulley 115 (as shown in FIG. 6), also attached to motor shaft 110, rotates counterclockwise at 1800 RPM, causing timing belt 134 to rotate counterclockwise. Timing belt 134 rotates pulley 120 counterclockwise at 300 RPM. The outer race 113b of second one-way clutch 113 is attached to pulley 120 and rotates freely relative to the inner race 113a of clutch 113, which is attached to driven shaft 116, and rotating in the clockwise direction. The speed and direction of these components are summarized in Table 1.

TABLE 1

| part | Ref. No. | Direction | Speed |
| --- | --- | --- | --- |
| motor shaft | 110 | CCW | 1800 |
| inner race | 112a | CCW | 1800 |
| outer race | 112b | CCW | 1800 |
| pulley | 114 | CCW | 1800 |
| timing belt | 132 | CW | N/A |
| pulley | 118 | CW | 1800 |
| driven shaft | 116 | CW | 1800 |
| feed screw | 30a | CW | 600 |
| pulley | 115 | CCW | 1800 |
| timing belt | 134 | CCW | N/A |
| pulley | 120 | CCW | 300 |
| outer race | 113b | CCW | 300 |
| inner race | 113a | CW | 1800 |

Referring to FIG. 5, when the motor shaft 110 rotates clockwise at 1800 RPM, pulley 115 (as shown in FIG. 6) which is attached to motor shaft 110, rotates clockwise at 1800 RPM, rotating timing belt 134 in the clockwise direction. Timing belt 134 rotates pulley 120 at 300 RPM in the clockwise direction. The outer race 113b of second one-way clutch 113 is attached to pulley 120 and rotates clockwise at 300 RPM. This locks clutch 113 so that inner race 113a also rotates clockwise at 300 RPM. The driven shaft, attached to inner race 113a, rotates clockwise at 300 RPM, rotating attached pulley 118. Pulley 118 rotates timing belt 132 clockwise. Timing belt 132 rotates pulley 114 counterclockwise at 300 RPM. The outer race 112b of clutch 112, which is attached to pulley 114, also rotates in the counterclockwise direction. Outer race 112b rotates freely relative to inner race 112a, which is attached to motor shaft 110, and is thus rotating at 1800 RPM clockwise. The speed and direction of these components are summarized in Table 2.

TABLE 2

| part | Ref. No. | Direction | Speed |
| --- | --- | --- | --- |
| motor shaft | 110 | CW | 1800 |
| inner race | 112a | CW | 1800 |
| outer race | 112b | CCW | 300 |
| pulley | 114 | CCW | 300 |
| timing belt | 132 | CW | N/A |
| pulley | 118 | CW | 300 |
| driven shaft | 116 | CW | 300 |
| feed screw | 30a | CW | 100 |
| pulley | 115 | CW | 1800 |
| timing belt | 134 | CW | N/A |
| pulley | 120 | CW | 300 |
| outer race | 113b | CW | 300 |
| inner race | 113a | CW | 300 |

As shown in FIG. 6, an additional speed reduction is performed between the driven shaft 116 and feed screws 30a and 30b. This final reduction is accomplished using a fifth timing belt pulley 140 (also referred to as pulley 140) attached to driven shaft 116, pulley 140 having a rotation speed equal to the rotation speed of driven shaft 116. A sixth timing belt pulley 142 (also referred to as pulley 142) is coupled to the feed screw by a screw shaft 144, which extends from the rear of the feed screw module 20. A third timing belt 146 extends between pulley 140 and pulley 142, which causes pulley 142 to rotate when the pulley 140 rotates. The sixth timing belt pulley 142 has three times as many teeth as the fifth timing belt pulley 140. Therefore, pulley 142 has a rotation speed which is one third of the rotation speed of pulley 140 and driven shaft 116.

In order to maintain positive engagement between the timing belts 132, 134 and 146 and their respective timing belt pulleys 114, 118, 115, 120, 140 and 142, each pair of pulleys is separated by a suitable distance. In particular, pulleys 115 and 140 have small diameters relative to respective pulleys 120 and 142, so greater distance is desirable for each of these pairs. This ensures that an adequate number of teeth on pulleys 115 and 140 engage their respective timing belts. One potential disadvantage of using the timing belt and pulley drive system is that the motor shaft 110 and driven shaft 116 are separated by a greater distance than would be present if the motor shaft 110 and driven shaft 116 were coupled by gears. This may increase the size of cabinet 40. In the exemplary embodiment, the impact of the shaft separation on overall cabinet 40 size is reduced by positioning the feed screw module 20 (including feed screws 30a and 30b) between the motor shaft 110 and the driven shaft 116. Thus, the first timing belt 132 and second timing belt 134 each surround the feed screw module 20 and feed screws 30a and 30b. This eliminates the need to allocate further space for feed screw module 20 and feed screws 30a and 30b.

FIG. 6 also shows a mechanism to implement a final 5:1 speed reduction between shaft 144 and the agitator shaft 126 (shown in FIG. 2). Preferably, the agitator is oriented so that its axis is horizontal. Then the final speed reduction may be accomplished simply by fourth coupling means, which include a seventh timing belt pulley 148 attached to shaft 144, an eighth timing belt pulley 150 attached to shaft 126 (shown in FIG. 2), and a fourth timing belt 152 extending between pulleys 148 and 150.

There are advantages to driving the agitator as described above. Since a single motor 130 drives both the feed screws 30a and 30b and the agitator, hardware costs are less than in systems which have separate motors for the feed screw and agitator; and the rotational speed of the agitator in the exemplary embodiment of the invention is proportional to the rotational speed of the feed screws 30a and 30b, so that the agitation speed is increased whenever the flow rate increases without employing complex controls for the agitator.

Some feeder configurations (e.g., those having conical hoppers) are incompatible with a horizontal agitator. Feeder systems with vertical agitators may also be constructed in accordance with the invention. To do so, the fourth coupling means are replaced by a known mechanical transmission mechanism, such as a belt and pulley arrangement which has a quarter twist between pulleys, or by toothed gearing.

In summary, for the particular example of the present invention, the feed screw rotates at 600 RPM when the motor is rotated counterclockwise; and the feed screw rotates at 100 RPM when the motor is rotated clockwise. This rotation speed change is accomplished by merely reversing an electrical switch to reverse the motor shaft 110 direction, as opposed to physically removing and replacing the gear box as was done in the prior art.

Each component has been described above as rotating in a clockwise or counterclockwise direction for ease of understanding. If the apparatus is viewed from behind, then the words clockwise and counterclockwise could be interchanged. Furthermore, the system may also be constructed so that all rotational directions are actually reversed by rotating the one-way clutches 112 and 113 by 180 degrees. The outer race 112b of clutch 112 then rotates freely clockwise relative to inner race 112a; and the inner race 113a of clutch 113 rotates freely counterclockwise relative to outer race 113b. The driven shaft 116 then rotates at 1800 RPM when motor shaft 110 rotates clockwise, and driven shaft 116 rotates at 300 RPM when motor shaft 110 rotates counterclockwise.

It is understood that the speeds described above and listed in Tables 1 and 2 are only examples, and that the motor may be driven at other speeds. If the motor shaft 110 rotates at less than 1800 RPM, then all other rotational speeds are reduced proportionately. Furthermore, a system in accordance with the invention may be constructed by substituting for pulleys 115 and 120 a pair of pulleys with a different turndown ratio. It is then simple to achieve different speed reductions than the 6:1 ratio described above.

In some feeder configurations, it may not be practical to position feed screw module 20 and feed screws 30a and 30b within the timing belts 132 and 134. In an alternate embodiment of the invention (not shown), the space inside timing belts 134 and 146 may be empty, in which case it is desirable to reduce the distances between pulleys 115 and 120, and between pulleys 140 and 142. A pair of belt tighteners may be positioned to apply tension to timing belt 134 near pulley 115 to increase the number of teeth on timing belt 134 which engage pulley 115. Similarly a second pair of belt tighteners near pulley 140 increase the number of teeth on timing belt 146 which engage pulley 140.

Although the invention has been described in terms of its use in volumetric feeders, it is understood by those skilled in the art of bulk materials handling, that the invention has broader applications. In particular, the invention may be applied to loss-in-weight feeder systems. A loss-in-weight feeder in accordance with the invention is similar to the volumetric feeder described above, except that the loss-in-weight feeder includes a scale and a process controller. The invention may also be applied to positive displacement pumps which meter liquids.

It is understood by one skilled in the art that many variations of the embodiments described herein are contemplated. While the invention has been described in terms of exemplary embodiments, it is contemplated that it may be practiced as outlined above with modifications within the spirit and scope of the appended claims.

What is claimed:

1. A feeder comprising:
   a hopper for containing solid material; a feed screw beneath said hopper for conducting said solid material from said hopper;
   a first one-way clutch, having a driven inner race and an outer race which rotates freely counterclockwise relative to said inner race when said inner race is driven clockwise and rotates with said inner race when said inner race is driven counterclockwise;
   a second one-way clutch, having a driven outer race and an inner race which rotates freely clockwise relative to said outer race of said second one-way clutch when said outer race of said second one-way clutch is driven counterclockwise and rotates with said outer race of said second one-way clutch when said outer race of said second one-way clutch is driven clockwise;
   a reversible motor having a rotating shaft attached to said inner race of said first one-way clutch;
   a driven shaft attached to said inner race of said second one-way clutch and coupled to said feed screw;
   first coupling means for coupling said outer race of said first clutch to said driven shaft to rotate said driven shaft at a first speed; and
   second coupling means for coupling said motor shaft to said outer race of said second clutch to rotate said second clutch and said driven shaft at a second speed which differs from said first speed.

2. A feeder according to claim 1, wherein:
   said first coupling means include:
   a first timing belt pulley, attached to said outer race of said first one-way clutch;
   a second timing belt pulley, attached to said driven shaft;
   a first timing belt, extending between said first and said second timing belt pulleys, which causes said second timing belt pulley to rotate when said first timing belt pulley rotates;
   and said second coupling means include:
   a third timing belt pulley, attached to said motor shaft;
   a fourth timing belt pulley, attached to said outer race of said second one-way clutch; and
   a second timing belt, extending between said third and said fourth timing belt pulleys, which causes said fourth timing belt pulley to rotate when said third timing belt pulley rotates.

3. A feeder in accordance with claim 2, wherein:
   said first timing belt pulley and said second timing belt pulley each have a common rotational speed;
   said third timing belt pulley has a rotational speed; and
   said fourth timing belt pulley has a rotational speed which differs from said rotational speed of said third pulley.

4. A feeder in accordance with claim 2, further comprising:
   a fifth timing belt pulley attached to said driven shaft, said fifth timing belt pulley having a rotation speed;
   a sixth timing belt pulley coupled to said feed screw, said sixth timing belt pulley having a rotation speed different from said rotation speed of said fifth timing belt pulley; and
   a third timing belt, extending between said fifth and said sixth timing belt pulleys, which causes said sixth timing belt pulley to rotate when said fifth timing belt pulley rotates.

5. A feeder in accordance with claim 2, wherein said feed screw is positioned between said motor shaft and said driven shaft.

6. A feeder in accordance with claim 2, wherein said first and second timing belts each surround said feed screw.

7. A feeder in accordance with claim 2, wherein said feed screw rotates at a first rotation speed when said motor shaft rotates clockwise, and said feed screw rotates at a second rotation speed when said motor shaft rotates counterclockwise.

8. A feeder in accordance with claim 1 in which said hopper has an opening at its bottom and said driven shaft has an adjustable rotation speed, said feeder further comprising:
   an agitator with a horizontal axis, said agitator rotating about said axis to prevent said material from blocking said opening; and
   agitator coupling means for coupling said agitator to said feed screw to rotate said agitator at a speed which is proportional to the rotation speed of said feed screw.

* * * * *

UNITED STATES PATENT AND TRADEMARK OFFICE
CERTIFICATE OF CORRECTION

PATENT NO. : 5,277,535
DATED : January 11, 1994
INVENTOR(S) : Kenneth W. Bullivant It is certified that error appears in the above-indentified patent and that said Letters Patent is hereby corrected as shown below:

Column 7, lines 51-53 (Claim 1): the words "a feed screw beneath said hopper for conducting said solid material from said hopper;" begin a new paragraph on a new line.

Signed and Sealed this

Thirteenth Day of September, 1994

Attest:

BRUCE LEHMAN

Attesting Officer

*Commissioner of Patents and Trademarks*